United States Patent
Bian et al.

(10) Patent No.: US 10,895,689 B2
(45) Date of Patent: Jan. 19, 2021

(54) SWITCHABLE AND RECONFIGURABLE GRATING COUPLERS

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

(*) Notice: Subject to any disclaimer, the term of this patent is extended or adjusted under 35 U.S.C. 154(b) by 127 days.

(21) Appl. No.: 16/199,811

(22) Filed: Nov. 26, 2018

(65) Prior Publication Data
US 2020/0166709 A1    May 28, 2020

(51) Int. Cl.
| | | |
|---|---|---|
| G02B 27/00 | (2006.01) | |
| G02B 6/34 | (2006.01) | |
| G02B 5/18 | (2006.01) | |

(52) U.S. Cl.
CPC .............. *G02B 6/34* (2013.01); *G02B 5/1828* (2013.01); *G02B 5/1847* (2013.01)

(58) Field of Classification Search
CPC .. G02B 6/29346; G02B 6/29334; G02B 6/34; G02B 5/1847; G02B 5/1828; G02B 6/124; G02B 2006/12061; G02B 2006/12176; G02F 1/292; G02F 1/065; G02F 1/2252
USPC ..... 359/34, 566, 573, 576, 578, 260; 385/37
See application file for complete search history.

(56) References Cited

U.S. PATENT DOCUMENTS

| | | | |
|---|---|---|---|
| 4,006,963 A * | 2/1977 | Baues | G02F 1/295 385/37 |
| 5,579,143 A | 11/1996 | Huber | |
| 6,356,674 B1 | 3/2002 | Davis et al. | |
| 6,791,757 B2 * | 9/2004 | Hobbs | G02F 1/133371 349/198 |
| 6,821,457 B1 | 11/2004 | Natarajan et al. | |
| 8,227,885 B2 * | 7/2012 | Tavkhelidze | H01L 31/02363 136/249 |
| 9,519,163 B2 | 12/2016 | Zheng et al. | |
| 2004/0149928 A1 * | 8/2004 | Gruhlke | G02B 6/124 250/458.1 |
| 2008/0049328 A1 * | 2/2008 | Zhou | G02F 1/292 359/566 |

OTHER PUBLICATIONS

Vasudev et al., "Electro-optical modulation of a silicon waveguide with an "epsilon-near-zero" material", Nov. 4, 2013 | vol. 21, No. 22 | Optics Express.
Kim et al., "Tunable Grating Couplers for Broadband Operation Using Thermo-Optic Effect in Silicon", IEEE Photonics Technology Letters, vol. 27, No. 21, Nov. 1, 2015.

* cited by examiner

*Primary Examiner* — Audrey Y Chang
(74) *Attorney, Agent, or Firm* — Thompson Hine LLP; Anthony Canale

(57) ABSTRACT

Structures for a waveguide and methods of fabricating a structure for a waveguide. A grating coupler is formed that has an arrangement of grating structures. A conformal layer is arranged over the plurality of grating structures. The conformal layer is composed of a tunable material having a refractive index that changes with an applied voltage.

13 Claims, 3 Drawing Sheets

SWITCHABLE AND RECONFIGURABLE GRATING COUPLERS

BACKGROUND

The present invention relates to photonics chips and, more specifically, to structures for a grating coupler and methods of fabricating a structure for a grating coupler.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components.

Grating couplers are commonly used in photonics chips for coupling optical signals between waveguides and optical fibers. In general, grating couplers are fixed optical elements having an optical performance that cannot be tuned, switched, or configured.

Improved structures for a grating coupler and methods of fabricating a structure for a grating coupler are needed.

SUMMARY

In an embodiment of the invention, a structure includes a grating coupler having a plurality of grating structures and a conformal layer arranged over the plurality of grating structures. The conformal layer is composed of a tunable material having a refractive index that changes with an applied voltage.

In an embodiment of the invention, a method includes forming a plurality of grating structures of a grating coupler, and forming a conformal layer over the plurality of grating structures of the grating coupler. The conformal layer is comprised of a tunable material having a refractive index that changes with an applied voltage.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
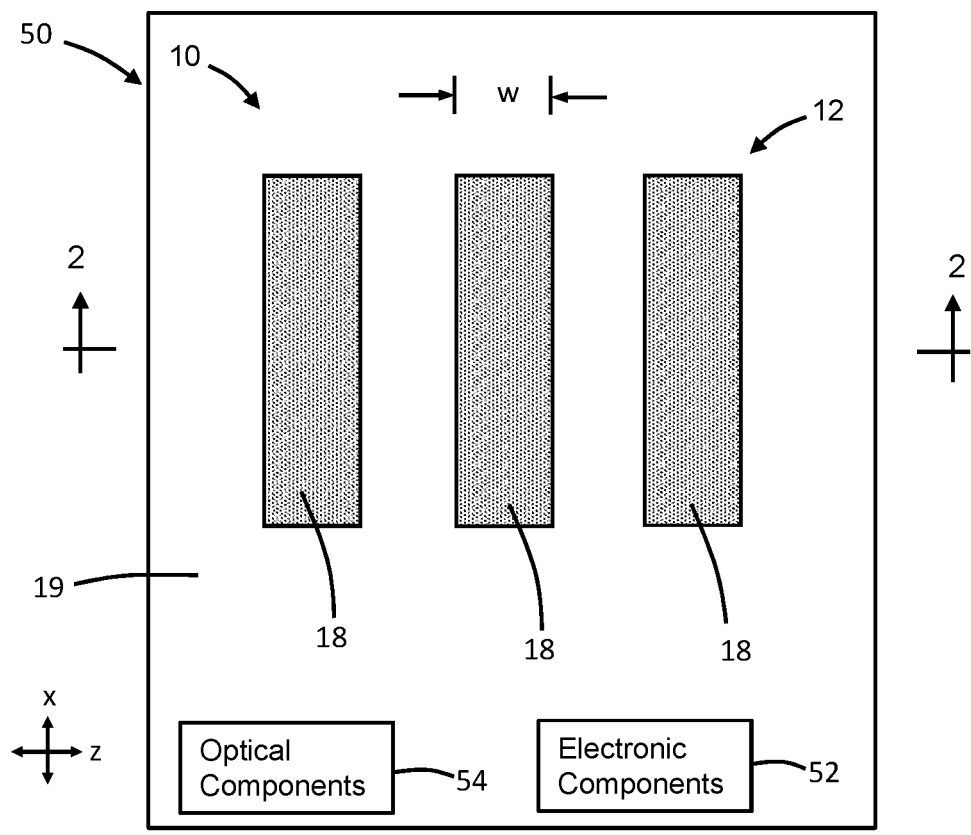
FIG. 1 is a top view of a photonics chip including a structure at an initial fabrication stage of a processing method in accordance with embodiments of the invention.
Figure 2:
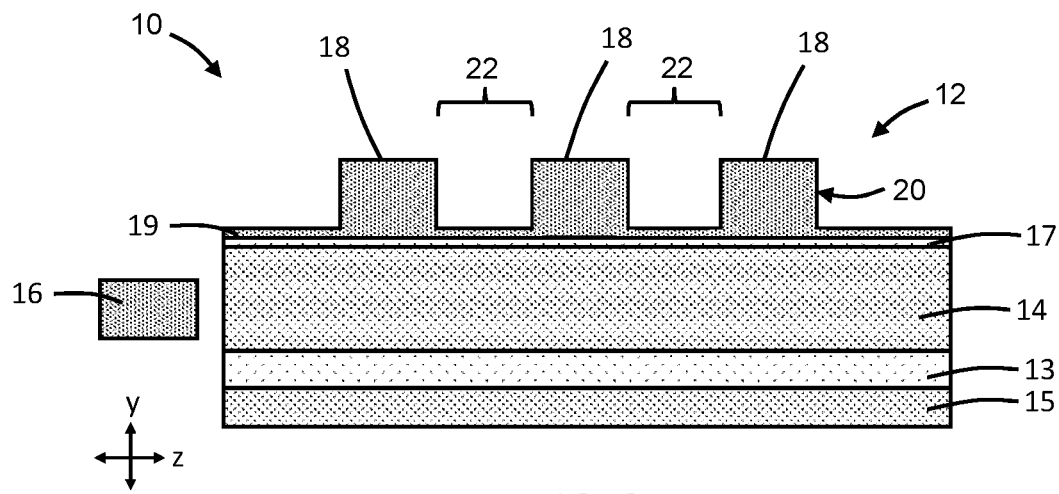
FIG. 2 is a cross-sectional view of the structure taken generally along line 2-2 in FIG. 1.

With reference to FIGS. 1, 2 and in accordance with embodiments of the invention, a structure 10 includes a grating coupler 12 arranged over a semiconductor layer 14 and a waveguide 16 that is coupled with the grating coupler 12. A dielectric layer 17 composed of a dielectric material, such as silicon dioxide, may be arranged between the grating coupler 12 and the semiconductor layer 14. The semiconductor layer 14 may be composed of a single-crystal semiconductor material, such as single-crystal silicon from a device layer of a silicon-on-insulator (SOI) wafer. The silicon-on-insulator (SOI) wafer further includes a buried insulator layer 13 composed of a dielectric material, such as silicon dioxide, and a substrate 15 composed of a semiconductor material. The waveguide 16 provides optical signals to the grating coupler 12.

The grating coupler 12 includes an arrangement of grating structures 18 defined in a layer, generally indicated by reference numeral 20, by notches or grooves 22. The grooves 22 are formed in the layer 20 by lithography and etching processes. In the representative embodiment, the grooves 22 extend partially through the layer 20 such that the grating structures 18 are connected with each other by a thin web 19 of the layer 20 that is located within the grooves 22 over the dielectric layer 17. The grooves 22 are trenches that define respective spaces or gaps arranged between adjacent pairs of the grating structures 18. In an embodiment, the grating structures 18 and grooves 22 may be arranged as a group of spaced-apart parallel lines having given dimensions (e.g., width, w, and length). In an alternative embodiment, the grating structures 18 and grooves 22 may be arranged as a group of concentric arcs that are nested together and that have given dimensions (e.g., width and arc length).

The grating structures 18 and grooves 22 may have a given periodicity defined by a pitch and a filling factor or duty cycle relating to their dimensions. The pitch represents a distance in a horizontal direction between adjacent pairs of the grating structures 18, and the duty cycle represents a fraction of the area of the grating coupler 12 that is occupied by the grating structures 18. In an alternative embodiment, the grating structures 18 of the grating coupler 12 may be apodized (i.e., aperiodic) with a pitch that varies as a function of position (i.e., location along the z-axis).

The grooves 22 may be formed in the layer 20 by lithography and etching processes that applies an etch mask formed by a lithography process over the deposited layer 20 and that etches the masked layer 20 with an etching process, such as reactive ion etching (ME). The etching process may be selected to stop on the material of the dielectric layer 17 after penetrating fully through the layer 20. In an embodiment, the grating structures 18 may be composed of a doped polycrystalline semiconductor material, such as doped polysilicon, that is deposited by chemical vapor deposition. In an embodiment, the grating structures 18 may be comprised of a conductor, such as a doped polycrystalline semiconductor material.

Figure 2A:
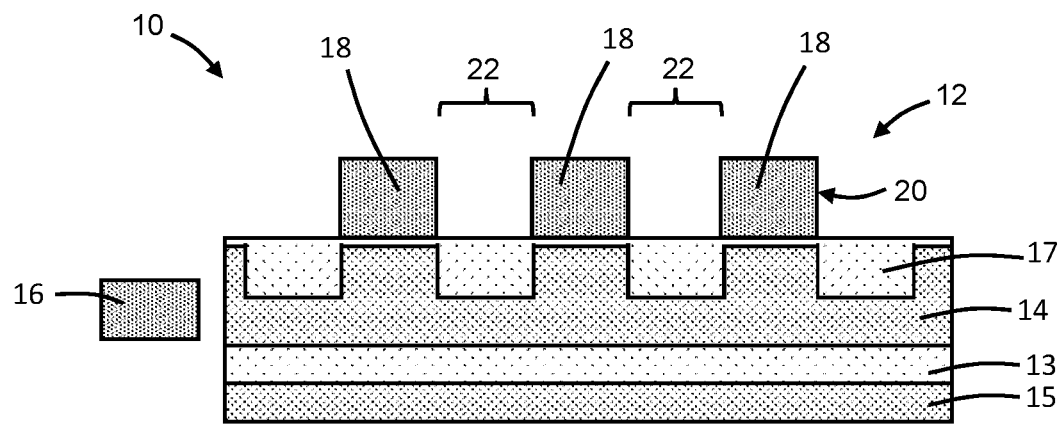
FIG. 2A is a cross-sectional view of a structure in accordance with alternative embodiments of the invention.

In an alternative embodiment and as shown in FIG. 2A, the etching process may extend the grooves 22 fully through the layer 20 such that the grating structures 18 are disconnected from each other. The etching process may be selected to stop on the material of the dielectric layer 17 after penetrating fully through the layer 20. In an alternative embodiment and as also shown in FIG. 2A, the semiconductor layer 14 may be patterned to form grooves that match the pitch and duty cycle of the grating structures 18 and grooves 22, and that are filled by the dielectric material of the dielectric layer 17.

In the representative embodiment, the grating structures 18 are depicted as rectangular shapes having vertical sidewalls. However, in alternative embodiments, the grating structures 18 may be trapezoidal with sidewalls tapering from top to bottom, trapezoidal with sidewalls having inverse tapering (i.e., flaring) from top to bottom, or non-rectangular (e.g., rounded sidewalls).

Figure 3:
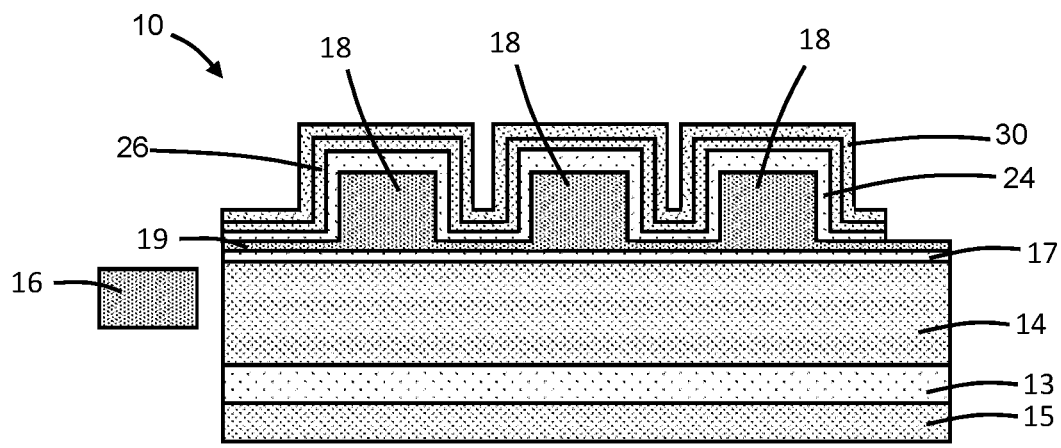
FIGS. 3-4 are cross-sectional views of the structure at successive fabrication stages subsequent to FIG. 2.

With reference to FIG. 3 in which like reference numerals refer to like features in FIG. 2 and at a subsequent fabrication stage, conformal dielectric layers 24, 26 composed of respective dielectric materials are sequentially formed by, for example, atomic layer deposition over the grating structures 18. The conformal dielectric layer 24 may be composed of an oxide of silicon (e.g., silicon dioxide) or an oxide of hafnium (e.g., hafnium oxide), and the conformal dielectric layer 26 may be composed of silicon nitride. The conformal dielectric layer 24 may be in direct contact with the exterior surfaces of the grating structures 18 and the web 19 of the layer 20, and the conformal dielectric layer 26 may be in direct contact with the conformal dielectric layer 24. The grating structures 18 are encapsulated or encased inside of the conformal dielectric layer 24 and the dielectric layer 17 with the conformal dielectric layer 26 providing an overlay extending across the encapsulated grating structures 18. As used herein, a layer that is conformal may be characterized by a substantially uniform thickness that conforms to any underlying topography.

A tunable material layer 30 is formed over the conformal dielectric layer 26, and may be formed in direct contact with the conformal dielectric layer 26 over the grating structures 18 and the web 19 of the layer 20. The tunable material layer 30 may be composed of a tunable material deposited as a conformal layer by atomic layer deposition or chemical vapor deposition. In an embodiment, the tunable material layer 30 may be composed of a conductor that is a tunable material by an applied bias voltage. In an embodiment, the tunable material layer 30 may be composed of indium-tin oxide (ITO). In an embodiment, the tunable material layer 30 may be composed of other types of inorganic tunable materials, such as vanadium oxide and germanium-antimony telluride, or a combination of one or both of these materials with indium-tin oxide. In an embodiment, the tunable material layer 30 may be composed of an electro-optic polymer or liquid crystal.

The ability to tune the tunable material of the arises from material properties of the tunable material layer 30 that provide a permittivity (i.e., dielectric constant) that can be varied by an applied bias voltage. The refractive index of the tunable material layer 30 is related to the permittivity and, for that reason, the refractive index of the tunable material layer 30 is also a function of a bias voltage applied to the tunable material layer 30. The refractive index of the tunable material layer 30 can be varied with the applied bias voltage to effectively switch the grating coupler 12 between different states for transmitting optical signals at a given wavelength. In one state (e.g., no applied bias voltage), the tunable material layer 30 may have a high refractive index and exhibit low optical signal absorption such that the grating coupler 12 has its transmission spectrum characterized by a peak wavelength with optimum coupling efficiency. In another state (e.g., an applied negative bias voltage), the tunable material layer 30 may have a high refractive index and exhibit low optical signal absorption such that the grating coupler 12 has its transmission spectrum characterized by a different peak wavelength with optimum coupling efficiency. For example, the peak wavelength for optimum coupling efficiency may be shifted by 10 nanometers to 50 nanometers between the two different states.

The conformal dielectric layers 24, 26 are composed of respective electrical insulators (i.e., dielectric materials) that are disposed between the grating structures 18 and the tunable material layer 30. In an alternative embodiment, the conformal dielectric layer 26 may be omitted from the structure 10 such that the tunable material layer 30 is in direct contact with the conformal dielectric layer 24.

Figure 4:
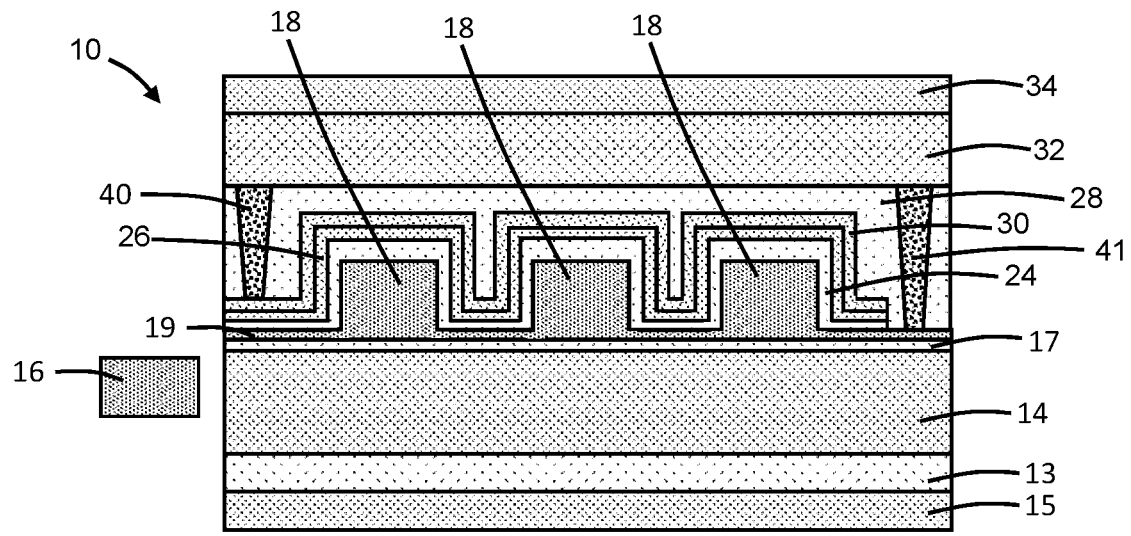

With reference to FIG. 4 in which like reference numerals refer to like features in FIG. 3 and at a subsequent fabrication stage, a dielectric layer 28 is formed over the grating coupler 12 and the tunable material layer 30. The dielectric layer 28 may have a thickness that is greater than the height of the grating structures 18 such that the grating coupler 12 is buried in the dielectric material of the dielectric layer 28. The dielectric layer 28 may be composed of a dielectric material, such as an oxide of silicon, deposited by chemical vapor deposition and planarized with, for example, chemical mechanical polishing (CMP). For example, the dielectric layer 28 may be composed of silicon dioxide deposited by chemical vapor deposition using ozone and tetraethylorthosilicate (TEOS) as reactants.

A multilayer back-end-of-line stack, generally indicated by reference numeral 32, is formed by back-end-of-line (BEOL) processing over the dielectric layer 28. The back-end-of-line stack 32 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers. An optional cladding layer 34 composed of a dielectric material, such as silicon nitride, may be deposited over the back-end-of-line stack 32.

A contact 40 may be formed that connects the tunable material layer 30 with wiring in the back-end-of-line stack 32, and a contact 41 may be formed that connects the grating structures 18 with wiring in the back-end-of-line stack 32. The contacts 40, 41 may be composed of a metal, such as tungsten, copper, or cobalt, and are located in respective etched contact openings. Through these connections, a switchable bias voltage may be applied from the wiring in the back-end-of-line stack 32 to the grating structures 18 and the tunable material layer 30.

The grating coupler 12 may be tunable with an adjustable and/or switchable coupling efficiency and a reconfigurable transmission spectrum. To that end, the tunable material layer 30 and the grating structures 18 are connected to a switchable bias voltage, which may be supplied from the wiring in the back-end-of-line stack 32. As discussed hereinabove, the bias voltage changes the permittivity and refractive index of the tunable material layer 30 such that the peak wavelength in the transmission spectrum of the grating coupler 12 is adjustable and configurable.

The tunable material layer 30 functions simultaneously as an optical layer that tunes the transmission/reflection of the grating coupler performance, and as an electrode to enable connection with metal contacts, which are used for applying voltages and enabling tunability. The ability to enable tunable coupling efficiency and a reconfigurable transmission spectrum may permit a single device structure to operate with optimal coupling efficiencies at different wavelengths and/or be used to compensate for a possible wavelength shift induced by fabrication imperfections. The ability to shift the wavelength transmitted through the grating coupler 12 may permit a single device structure to be used on photonics chips in which the optical components handle multiple wavelengths, such as in association with wavelength-division multiplexing.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

Figure 5:
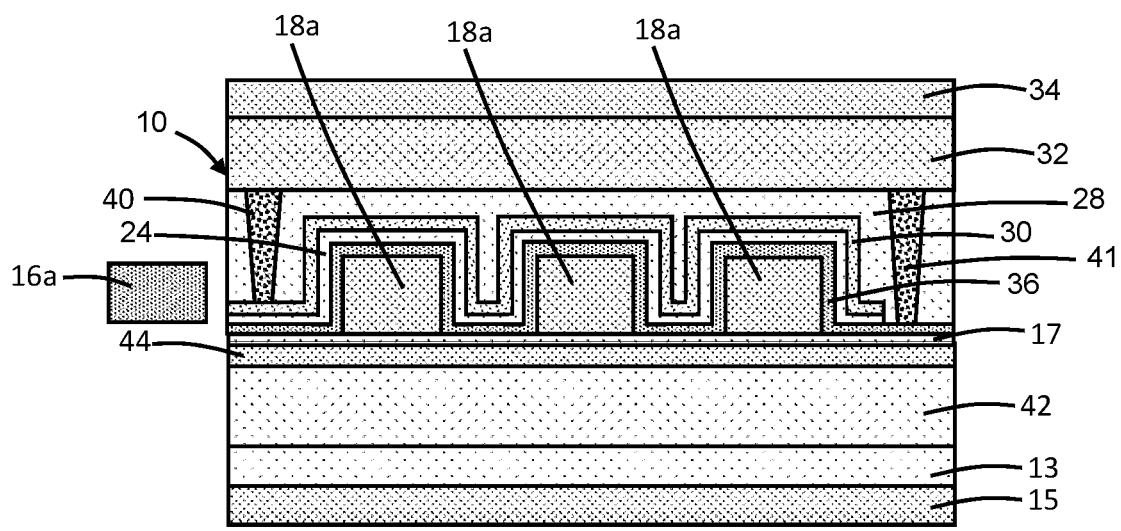
FIG. 5 is a cross-sectional view of a structure in accordance with alternative embodiments of the invention.

With reference to FIG. 5 in which like reference numerals refer to like features in FIG. 2 and in accordance with alternative embodiments of the invention, the structure 10 may be modified to form grating features 18a of the grating coupler 12 from a different material. In an embodiment, the grating features 18a may be composed of a dielectric material, such as silicon nitride. Otherwise, the grating features 18a may have the same arrangement as the grating features 18a. A waveguide 16a, which provides optical signals to the grating coupler 12, is composed of the same material as the grating features 18a. The grating coupler 12 may be formed over a dielectric layer 42 composed of, for example, silicon dioxide, instead of being formed over the semiconductor layer 14, and an additional dielectric layer 44 composed of, for example, silicon nitride may be formed between the grating coupler 12 and the dielectric layer 42.

A conformal layer 36 composed of a conductor, such as a doped polycrystalline semiconductor material (i.e., doped polysilicon), may be deposited over the grating features 18a before forming the conformal dielectric layer 24, and the conformal dielectric layer 26 may be omitted. The conformal layer 36 may be arranged in direct contact with the exterior surfaces of the grating features 18a. The tunable material layer 30 and the conformal layer 36 are connected with the switchable source of bias voltage. Specifically, the contact 40 may connect the tunable material layer 30 with wiring in the back-end-of-line stack 32, and the contact 41 may connect the conformal layer 36 with wiring in the back-end-of-line stack 32.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a grating coupler including a plurality of grating structures and a layer defining a web that connects the plurality of grating structures, the plurality of grating structures and the layer comprised of doped polysilicon;
    a first conformal layer arranged over the plurality of grating structures, the first conformal layer comprised of a tunable material having a refractive index that changes with an applied voltage;
    a first contact directly connected with the first conformal layer; and
    a second contact directly connected with the layer and the plurality of grating structures.

2. The structure of claim 1 wherein the tunable material is indium-tin oxide.

3. The structure of claim 1 wherein the tunable material is indium-tin oxide, vanadium oxide, germanium-antimony telluride, or a combination thereof.

4. The structure of claim 1 wherein the tunable material is an electro-optic polymer or a liquid crystal.

5. The structure of claim 1 further comprising:
    a back-end-of-line stack arranged over the first conformal layer and the plurality of grating structures,
    wherein the first contact and the second contact are coupled with the back-end-of-line stack.

6. The structure of claim 1 further comprising:
    a conformal dielectric layer arranged as a second conformal layer between the first conformal layer and the plurality of grating structures.

7. The structure of claim 1 further comprising:
    a back-end-of-line stack arranged over the grating coupler.

8. The structure of claim 7 further comprising:
    a dielectric layer arranged over the back-end-of-line stack, the dielectric layer comprised of silicon nitride.

9. The structure of claim 1 wherein the grating coupler includes a plurality of grooves, each groove is arranged between an adjacent pair of the grating structures, and the web defined by the layer is located within the plurality of grooves.

10. A method comprising:
    forming a grating coupler having a plurality of grating structures and a layer defining a web that connects the plurality of grating structures;
    forming a first conformal layer over the plurality of grating structures of the grating coupler;

forming a first contact directly connected with the first conformal layer; and forming a second contact directly connected with the layer and the plurality of grating structures, wherein the plurality of grating structures and the layer are comprised of doped polysilicon, and the first conformal layer is comprised of a tunable material having a refractive index that changes with an applied voltage.

11. The method of claim 10 further comprising:

depositing a conformal dielectric layer arranged as a second conformal layer over the plurality of grating structures and between the first conformal layer and the plurality of grating structures.

12. The method of claim 11 further comprising:

forming a back-end-of-line stack arranged over the grating coupler, wherein the first contact and the second contact are each connected with wiring in the back-end-of-line stack.

13. The method of claim 10 wherein the grating coupler includes a plurality of grooves, each groove is arranged between an adjacent pair of the grating structures, and the web defined by the layer is located within the plurality of grooves.

* * * * *